United States Patent [19]

Pajunen et al.

[11] Patent Number: 4,915,959
[45] Date of Patent: Apr. 10, 1990

[54] METHOD FOR THE CONTINUOUS MATURATION OF FERMENTED BEER

[75] Inventors: Esko Pajunen, Helsinki; Veijo Makinen, Espoo; Heikki O. Lommi, Kantvik; Markku S. Loisa, Hanko, all of Finland

[73] Assignee: Suomen Kokeri Oy, Helsinki, Finland

[21] Appl. No.: 191,320

[22] Filed: May 9, 1988

[51] Int. Cl.$^4$ ............................................. C12C 11/04
[52] U.S. Cl. .................................... 426/13; 426/11; 426/16; 426/271; 426/592
[58] Field of Search ................... 426/11, 13, 16, 271, 426/592; 435/93

[56] References Cited

U.S. PATENT DOCUMENTS

| | | | |
|---|---|---|---|
| 3,852,495 | 12/1974 | Schimpf et al. | 426/13 |
| 4,009,286 | 2/1977 | Moll et al. | 426/13 |
| 4,708,875 | 11/1987 | Godtfredsen et al. | 426/13 |
| 4,790,238 | 12/1988 | Hsu | 426/16 |

Primary Examiner—Marianne Cintins
Attorney, Agent, or Firm—Baker & McKenzie

[57] ABSTRACT

Beer is fermented by the use of yeast and after fermentation the yeast is removed and the maturation or lagering of the beer is accomplished by a continuous maturation process which involves heat treating the beer to convert all or substantially all the alpha acetolactate and other diacetyl precursors present to diacetyl, cooling the beer, and feeding the heat treated fermented beer through a reaction column packed with immobilized yeast cells at a flow rate which effects the conversion of said diacetyl to acetoin in order to lower the concentration of said diacetyl to levels which do not result in tastes normally considered unacceptable for a beer.

12 Claims, 4 Drawing Sheets

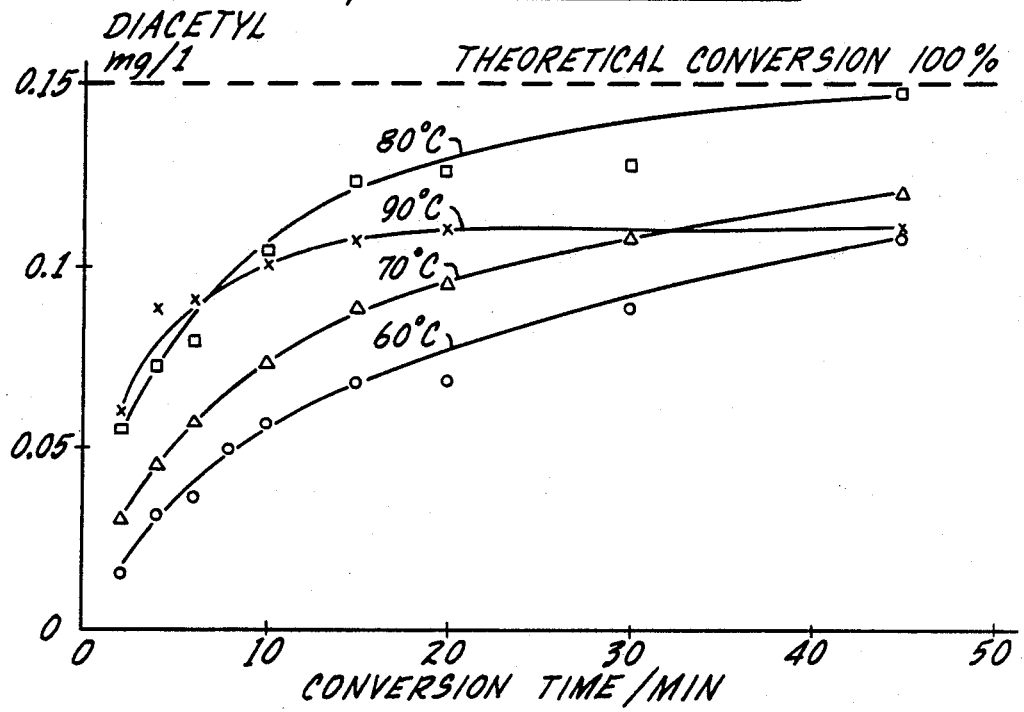
Fig. 1. α-ACETOLACTATE CONVERSION TO DIACETYL AT pH 4.2 IN WATER MATRIX
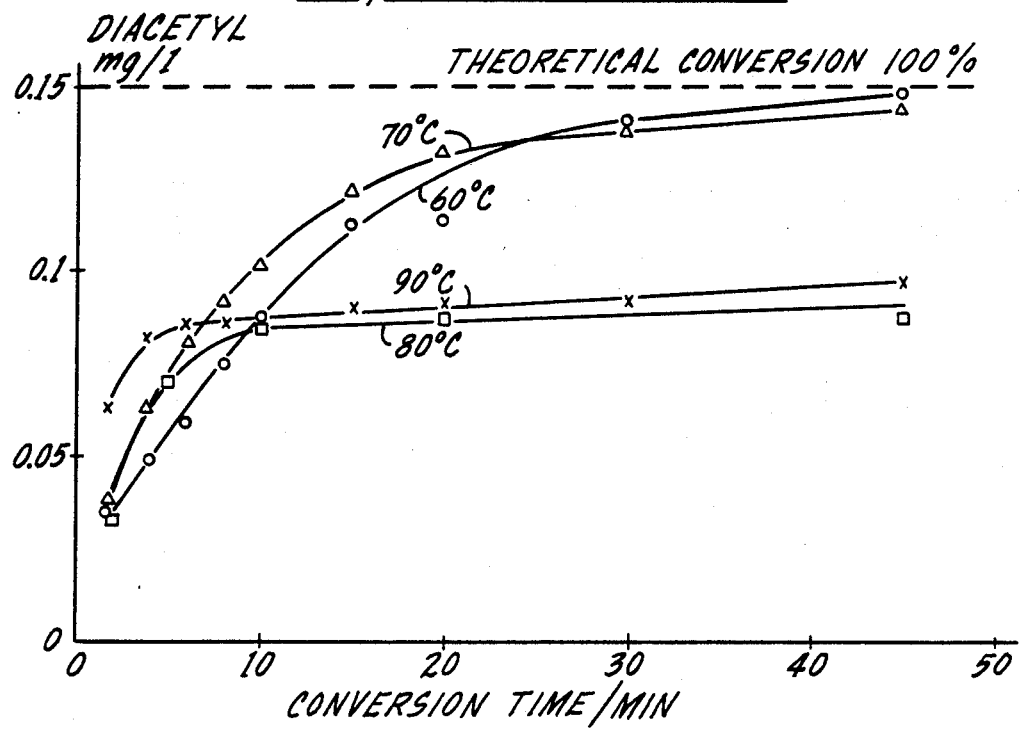
Fig. 2. α-ACETOLACTATE CONVERSION TO DIACETYL AT pH 4.2 IN BEER MATRIX

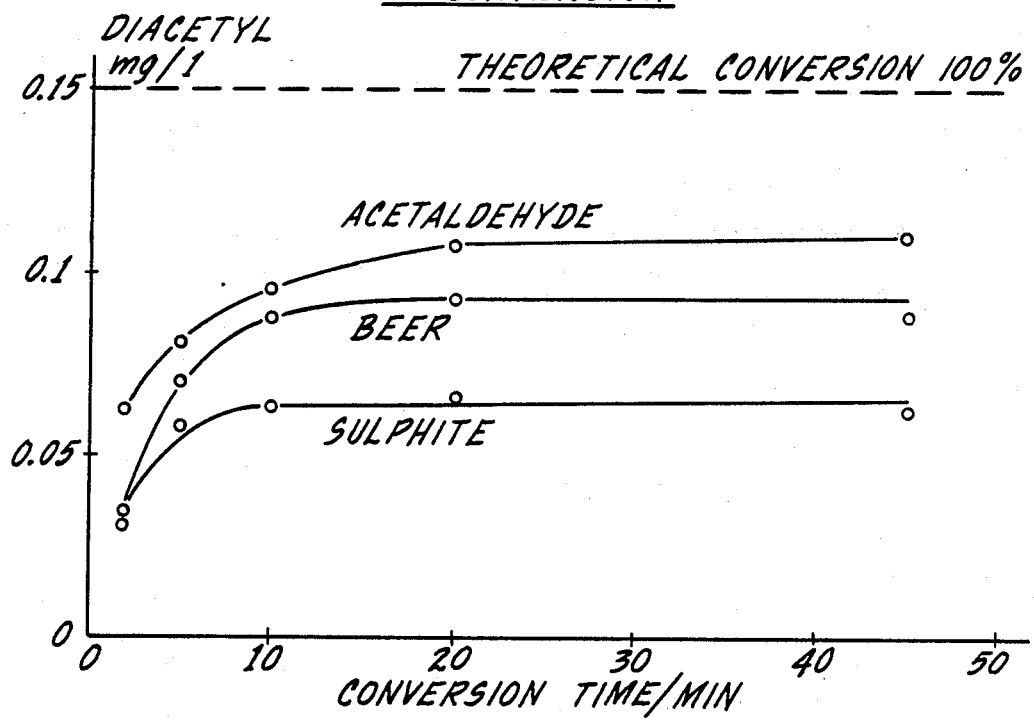
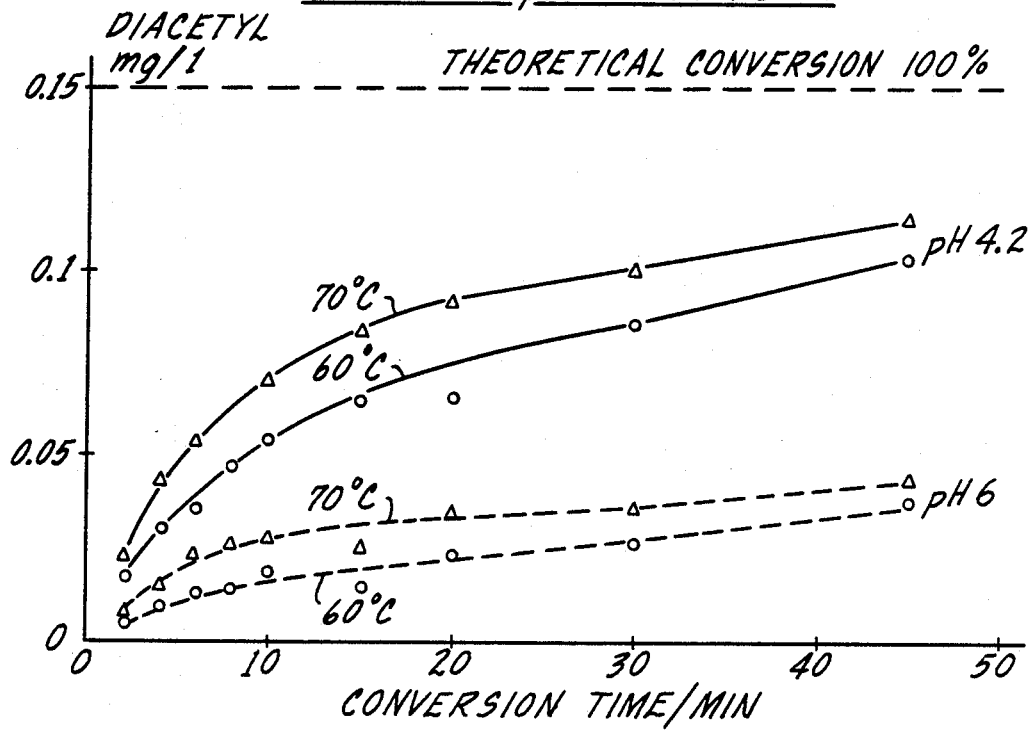

DIACETYL REDUCTION IN DEAE AND ALGINATE COLUMNS

DIACETYL REMOVAL AT VARIOUS FEED RATES: LABORATORY SCALE

CONVERSION OF ACETOLACTATE: PILOT SCALE

VARIOUS TRIALS OF α-ACETOLACTATE CONVERSION IN DESCENDING ORDER OF INITIAL CONCENTRATION

DIACETYL REMOVAL AT VARIOUS FEED RATES: PILOT SCALE

METHOD FOR THE CONTINUOUS MATURATION OF FERMENTED BEER

TECHNICAL FIELD

This invention relates to a method for the continuous maturation of fermented beer. In one specific aspect, the invention relates to a method in which the yeast is substantially removed from fermented beer, which is heat treated to convert all or substantially all of the alpha acetolactate and other diacetyl precursors present in the beer to diacetyl and feeding said heat treated beer through a column containing immobilized yeast cells at a rate sufficient to lower the concentration of diacetyl to acceptable taste concentrations.

BACKGROUND OF THE INVENTION

The brewing of beer is an ancient art. Malting and fermentation of cereals to produce "beer" commenced between about 2000 B.C. and 3000 B.C. in Mesopotamia. The art of brewing beer in Europe has been practiced since at least the Fourth Century and most likely earlier. However, the basic ingredients for brewing beer have remained essentially unchanged over the centuries: barley, malt, water, hops and yeast. The Beer Purity Laws enacted in Bavaria in 1516—the Reinheitsgebot—limit brewing materials to these ingredients and are still followed today in all of Germany with respect to domestically consumed beer.

The basic process for brewing beer has not significantly changed over the centuries and essentially includes:

malting barley by germination—the purpose of malting is to bring forth enzymes that break down starch and proteins to less complex water soluble compounds, i.e. amino acid, fermentable sugars and small peptides;

crushing malted barley to create "grist";

adding water to the grist to create a mash;

separating the resulting aqueous extract, known as the "wort" which is rich in fermentable sugars and other nutrients;

boiling the wort with hops to add flavors and stop enzymatic action;

cooling and clarifying the wort;

fermenting the wort with yeast to convert glucose to ethanol and carbon dioxide ("primary fermentation") to produce the "green" or "young" beer;

maturing or "lagering" the fermented "green" or "young" beer, generally by means of "secondary fermentation", again using yeast;

filtering, pasteurizing and packaging the beer.

The maturation or "lagering" step is an exceptionally important aspect of the process; careful and exact lagering is required to create beer with mature and consistent flavor.

During primary fermentation, one of the first phases is yeast growth. During this phase—as the yeast cells multiply —all biochemical activities including amino acid synthesis are "switched on". In the biochemical pathway of valine synthesis (an amino acid), alpha acetolactate is formed in excess quantities and secreted by the yeast cells into the wort. In the wort outside the yeast cells the alpha acetolactate is converted chemically (not enzymatically) by decarboxylation to a diketone, diacetyl ($CH_3COCOCH_3$); the conversion of alpha acetolactate to diacetyl is a chemical reaction controlled by the pH, temperature and the redox state of the beer.

Many diketones, including diacetyl, are strong flavor components and have very low taste threshold; diacetyl can be detected at concentrations of about 0.05 ppm and has a strong buttery or butterscotch flavor, which is a characteristic of "green" or "young" or immature beer. In order to balance the flavor of beer after primary fermentation, lagering or other forms of maturation are utilized to reduce the concentration of diacetyl below that of the human taste threshold. The classic method of lagering involves "secondary fermentation" wherein the green beer is fermented for a second time by yeast; typically, the beer from the primary fermentation tank is run into an enclosed lager tank with yeast at about $2-5 \times 10^6$ per/ml and fermentable sugars. The yeast cells—during this phase—are transporting diacetyl into the cells where the diacetyl is enzymatically reduced by diacetyl reductase or other enzymes to yield acetoin; acetoin has a much less intense flavor and a significantly higher taste threshold, i.e. about 50 ppm–1,000 ppm, than diacetyl.

The reaction rate of diacetyl to acetoin is much faster than the reaction rate of acetolactale to diacetyl under standard brewing temperatures and conditions. However, in order to prevent the formation of diacetyl in the maturation stage, it is necessary to limit the amount of diacetyl precursors (including alpha acetolactate) present as the beer enters the maturation stage. If this is not accomplished, "potential" diacetyl remains which, during or after the maturation stage, can alter the flavor of the beer.

During primary fermentation, diketones other than diacetyl are also produced and the maturation process adjusts other flavor elements. However, the primary goal of maturation—and the most understood—is the reduction of diacetyl concentration.

Secondary fermentation is, however, a lengthy process, which can typically last two weeks or more and is always conducted as a "batch" process. Commercial brewers—who brew beer in vast quantities—have sought methods which "mature" beer faster, cheaper and more efficiently. Among the prior art methods utilized is "ageing" the beer, i.e. fermenting the beer to completion during primary fermentation so that very little diacetyl remains; the beer is then held at 2° C.-4° C. for two to four days. This can be accomplished in a single, universal tank wherein the beer is fermented, aged and finished in a single tank without any transfers. This "ageing" process is practiced by most major breweries in the United States.

Another process involves a diacetyl "rest". In this process, the green beer is held at a temperature of 12° C.-18° C. for a week following primary fermentation, followed by secondary fermentation at lower temperatures. This "rest" allows all or substantially all of the alpha acetolactate to be secreted by the yeast and reduced to diacetyl, which is subsequently enzymatically reduced to acetoin during maturation.

However, these methods still require substantial time to properly "age" or "mature" the beer. Neither of these methods —or any other prior art methods—are "continuous" processes; utilization of a continuous maturation process could potentially increase the efficiency of and reduce the brewing time and cost for the production of beer. The instant invention, however, substantially reduces the amount of maturation time and provides—for the first time—a continuous, efficient and relatively inexpensive method for the maturation of fermented beer.

SUMMARY OF THE INVENTION

The present invention contemplates a method for the continuous maturation of fermented beer which effectively reduces the concentration of diacetyl to an acceptable taste level. The method can be used in conjunction with traditional malting, fermentation and processing techniques, along with traditional ingredients to produce a mature tasting beer of conventional taste.

The present invention contemplates a method wherein substantially all of the yeast present in the fermented beer is removed—by centrifugation or other suitable methods—following primary fermentation.

The resulting "green" or immature beer is heat treated under pressure to reduce all or substantially all of the alpha acetolactate and other diacetyl precursors present in the beer to diacetyl. This heat treatment is preferably carried out at temperatures of less than about 90° C. with a temperature of about 60° C. being particularly preferred. The heat treated beer is then cooled and fed through a reaction column packed with immobilized yeast cells at a flow rate sufficient to lower the concentration of diacetyl to levels which are acceptable from a taste perspective.

The carrier of choice for the reaction column is a DEAE cellulose resin. In a preferred embodiment, immobilized yeast cells are present in a cell density of about $10^5$ to about $10^{10}$ yeast cells per gram of carrier, with a cell density of about $10^7$ cells per gram of carrier being particularly preferred. The flow rate of the heat treated beer must be sufficient to allow the reduction of the diacetyl present to acetoin at sufficient levels to lower the concentration of diacetyl to acceptable taste levels. The preferred flow rate is below 2 bed volumes/hour, with a flow rate of about 0.5 bed volumes per hour being particularly preferred.

BRIEF DESCRIPTION OF THE DRAWINGS

FIG. 1 shows the conversion over time of alpha-acetolactate to diacetyl in a water matrix at pH 4.2 at various temperatures: 60° C., 70° C., 80° C. and 90° C.

FIG. 2 shows the conversion over time of alpha-acetolactate to diacetyl in a beer matrix at pH 4.2 at various temperatures: 60° C., 70° C., 80° C. and 90° C.

FIG. 3 shows the effect of bisulfate and acetaldehyde on the conversion over time of alpha-acetolactate to diacetyl compared to conditions when bisulfate or acetaldehyde are not present.

FIG. 4 shows the effect of pH on the conversion over time of alpha-acetolactate to diacetyl. Conversion was measured at pH 4.2 and pH 6 at both 60° C. and 70° C.

DETAILED DESCRIPTION OF THE PREFERRED EMBODIMENTS

A. General

Figure 5:
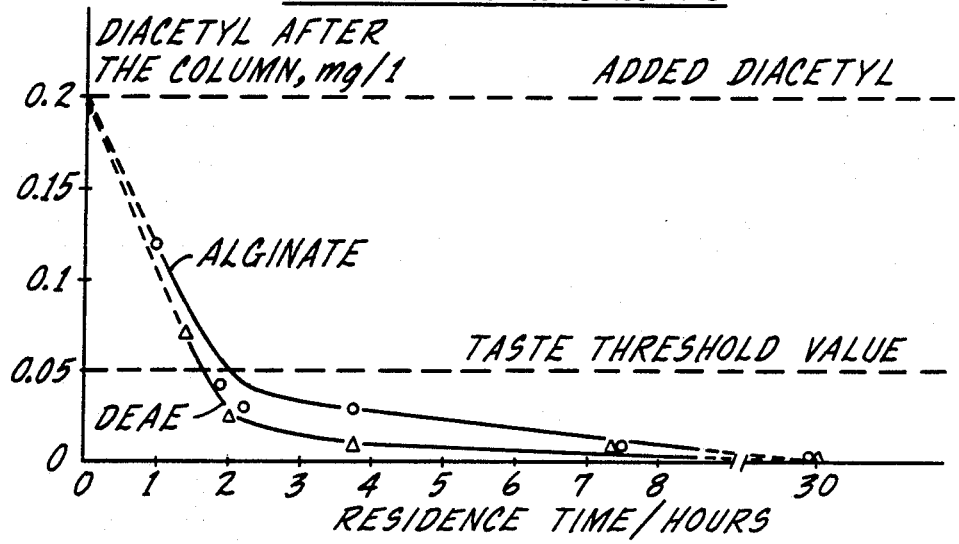
FIG. 5 shows the comparison of the reduction over time of diacetyl concentrations using a DEAE column and an alginate column compared to the taste threshold value of diacetyl.

It is contemplated that the methods of the instant invention will be used in the context of traditional primary fermentation procedures and materials (i.e. barley, malt, water, hops and yeast). The fermented or "green" or "young" beer which has the traditional flavor components is then balanced or matured by means of the novel methods set forth herein.

Following primary fermentation, the first phase of the invention is the removal of substantially all of the yeast from the green or young beer; this removal can be done by centrifugation or other suitable means. The yeast, after this stage, must be in the beer at low concentrations, preferably less than $10^4$ cells/ml. The yeast cells that are present are autolyzed in the next stage—heat treatment—and if high concentrations of cells are present, the products generated by autolyzation may have adverse flavor effects on the beer. If the yeast cells are present in concentrations less than about $10^4$ cells/ml the products of autolysis will be low and will not adversely effect the beer.

Following removal of the yeast, the beer is heat treated. As discussed earlier, in traditional methods, after primary fermentation is complete, the beer is transferred to the lagering cellar for maturation or left in the fermentor for maturation. In the instant invention, the green beer is heat treated for two purposes: (1) to convert all or substantially all of the alpha acetolactate and possibly other diacetyl precursors present in the beer to diacetyl; and (2) pasteurize the green beer prior to maturation.

In laboratory scale experiments it was shown that the reaction rat of alpha acetolactate to diacetyl is dependent on the temperature and also on beer pH and the acetaldehyde-bisulphite balance. At temperatures of about 60° C. to about 70° C., the added alpha acetolactate was found almost totally as free diacetyl and the conversion appeared to be completed: at higher temperatures of 80° C. and 90° C. the free diacetyl level did not rise to the same level. Whether this was due to incomplete conversion caused by complex binding of bisulphite with alpha acetolactate or diacetyl, or to a continuation reaction of alpha acetolactate directly to acetoin, is not yet known.

In pilot scale experiments (using larger amounts of fermented beer) the temperature wa kept constant at 60°

C. and the time varied according to the feed rate. The results showed that alpha acetolactate did decarboxylate rather well during the heat treatment, and only low levels of alpha acetolactate were left in the beer after the heat treatment and prior to the next step of maturation The results also showed that the diacetyl yield varied indicating in some cases a further reaction directly to acetoin or complex binding of some kind. If the reaction proceeded directly to acetoin, there would naturally be no further risks of diacetyl formation at later stages in the process.

During the heat treatment phase, the heat treatment unit must be pressurized to prevent the carbon dioxide dissolved in the beer (generated by primary fermentation) from escaping. The time required for heat treatment varies depending on the temperature used; these parameters can be adjusted to maximize the conversion to diacetyl. At 60° C., the preferred heat treatment time is about 20 minutes, after which the treated beer is cooled to a temperature of between about 0° C. to about 25° C. in preparation for the next phase.

Following heat treatment, the next stage is the reduction of diacetyl to acetoin to lower the concentration of diacetyl to acceptable taste levels. This is accomplished by feeding the heat treated beer through a column reactor which is packed with immobilized yeast cells. Preferably, the yeast cells are grown to provide a density of between $10^5$–$10^{10}$ cells/gram carrier, with a density of about $10^7$ cells being particularly preferred. The density must be sufficient to provide enough enzymatic activity to reduce the diacetyl in the beer to acetoin.

The carrier material is critical in terms of providing an adequate environment for yeast growth and contact with the eluant. DEAE-cellulose has several superior qualities compared with other carriers, such as alginate beads, including fewer mass transfer problems, easier immobilization, faster start-up, and potential regenerability and reusability of the column.

In laboratory scale experiments both alginate beads and DEAE-cellulose granules were tested. Both carrier materials behaved in much the same manner, but the DEAE-cellulose material had a slightly better diacetyl removing capacity suggesting a better contact between yeast and beer during treatment. The better contact might be explained by the mode of action of the immobilized yeast. Electron micrographs showed that in the alginate beads the yeast grows in colonies, some of which grow through the alginate layer to the bead surface. The yeast colonies presumably act as the "active sites" in the alginate beads. In the DEAE-cellulose granules the yeast grows rather loosely and separately in the pockets of the fibrous material and these individual cells act as "active sites" in the DEAE-cellulose columns.

Utilizing DEAE cellulose as the carrier also permits easy start up because the immobilization can take place in site within the column; this procedure lowers the risk of contamination and improves the conditions of the system as a whole. In addition, the column can be easily regenerated which is an important, if not critical, economic feature. To regenerate the column reactor, it is washed and sterilized with hot caustic solution; after washing and neutralization, the carrier is ready for re-pitching and reimmobilization. In pilot scale set ups the column was utilized for at least four weeks without need for regeneration which may be necessary due to polyphenol protein impurities or contamination from beer, microbial contamination or from mutations of the immobilization yeast itself.

The flow rate of the beer through the column is an important parameter because the diacetyl reduction capacity is dependent on the flow rate. It has also been shown that the flow rate determines the number of yeast cells which remain bound in the carrier. With high flow rates the yeast cell outflow is increased; diacetyl reduction may also be dependent on the cell number bound in the immobilized system, and not only on the throughput rate of the substrate. If the flow rate is too high, the diacetyl removal is incomplete and/or inadequate; by controlling the flow rate, the diacetyl concentration can be controlled, typically by seeking a concentration which is below the human taste threshold. However, in certain beers, a given amount of diacetyl (buttery) flavor is desirable. By adjusting the flow rate, the brewer can obtain diacetyl concentration which gives the beer any desired flavor.

The amount of yeast cells which remain bound to the carrier material appears to be relatively stable at low flow rates, suggesting that yeast growth and leaching of the cells are balanced. With higher flow rates leaching increases but the cell number returns back to the normal level again when the flow rate is decreased. The flow rate must be high enough to enable the leaching of dead cells in order to avoid autolysis. During the operation of the immobilized yeast column reactor the yeast is maintained viable by controlling the attenuation degree of the primary fermented beer and ensuring that there is some fermentable sugars left in the beer. The amount of fermentable sugars shall be kept in normal operation below about 1.5% in order to avoid excessive yeast growth and a possible increase in the alpha acetolactate synthesis during the yeast growth.

The immobilized yeast column reactor must be pressurized and the operation pressure must be high enough to keep the carbon dioxide soluble in the column and to avoid the possible channeling of the $CO_2$ bubbles through the immobilized yeast column which might cause the ineffective use of column. The pressure is chosen according to the operation temperature.

Following maturation, the eluted beer is cooled down to the stabilization temperature and collected into a buffer tank for the conventional post-fermentation treatment, e.g., filtering, pasteurization and packaging.

The beer maturation system described above is a faster and cheaper system than traditional maturation processes and produces mature beer with acceptable taste equivalent to the taste resulting from conventional maturation processes. The time needed for maturation is reduced from weeks to a matter of hours by the instant invention which, along with the continuous nature of the process, provides a vast potential for time and money savings in commercial brewing.

B. Experimental

1. LABORATORY SCALE EXPERIMENTS a. Conversion of Aloha Acetolactate to Diacetyl

The reaction of alpha acetolactate to diacetyl was investigated by adding pure alpha acetolactate separately in both water and beer matrices. The beer utilized was beer traditionally brewed and matured; free diacetyl was added to reach a concentration of about 0.20 mg/l. The alpha acetolactate addition was 0.15 mg/l as diacetyl, assuming 100% conversion. The samples were incubated at 60, 70, 80 and 90° C. for given periods of time to allow the conversion to proceed. The reaction wa stopped by transferring the samples to ice. The diacetyl formed was measured as follows.

In the first step, free diacetyl was measured from a 6 ml sample after 60 minutes of incubation at 30° C. encapsulated in a 20 ml glass vial. 2,3-Hexanedione was included as internal standard. In the second step, alpha acetolactate was determined after an analytical conversion of alpha acetolactate to diacetyl by incubation for 1.5 hours at 60.C. After the conversion diacetyl was measured as in step 1, giving free diacetyl +alpha acetolactate.

In the third step acetoin was determined after oxidation of acetoin to diacetyl with $FeCl_3$, $FeSO_4$ and $H_2SO_4$. After the oxidation diacetyl was determined as in step 1, giving free diacetyl +alpha acetolactate +acetoin.

Diacetyl analyses were performed in an HP 5790 gas chromatograph with an EC detector by injecting a 100 micro 1 sample of the gas phase. Injector and detector temperatures were 90° C. and 125° C., respectively. The column used was a DW-Wax-30 N, 30 m with 0.5 u m film.

The temperature program was 26° C., 5 minutes, 80° C., 4 minutes, 95° C., 2 minutes and the gas flows were carrier gas: He, 2.7 ml/min; makeup gas: $N_2$ at 30 ml/min.

The reaction of alpha acetolactate to diacetyl in a water matrix is shown in FIG. 1 was strongly dependent on the reaction temperature. The alpha acetolactate reaction to diacetyl was almost completed only at 80° C. during the 45 minute reaction time used. At 60° C. and 70° C. the complete conversion requires a longer time. At 90° C. the conversion started very rapidly but then leveled off to a constant level, suggesting possibly a different reaction pathway, e.g., partial reaction of alpha acetolactate directly to acetoin at 90° C.

In a beer matrix, as shown in FIG. 2, the situation appeared to be more complex than in the water matrix. In the beer matrix, the reactions of alpha acetolactate to diacetyl seemed to proceed more rapidly and more completely at 60° C. and 70° C.; at 80° C. and 90° C. the reaction was incomplete.

We suggest that the reason for the incomplete conversion in the beer matrix is the residual bisulphite in the beer after fermentation. Bisulphite is known to be able to bind alpha acetolactate and/or diacetyl. The effect of bisulphite was investigated in the beer matrix at 80° C., as shown in FIG. 3 together with the effect of acetaldehyde, known to have a high binding affinity to bisulphite.

The effects of bisulfite and acetaldehyde on the conversion of alpha acetolactate to diacetyl were investigated by adding 45 mg/l $SO_2$ as $Na_2S_2O_5$ or 45 mg/l acetaldehyde respectively.

A decrease in diacetyl concentrations after the reaction was observed, suggesting the formation of a complex between bisulphite and alpha acetolactate or diacetyl. The results also show a pronounced increase in the level of diacetyl with added acetaldehyde, suggesting the binding of natural bisulphite to acetaldehyde rather than to alpha acetolactate or diacetyl giving better reaction results as shown in FIG. 3.

The effect of pH on the reaction of alpha acetolactate to diacetyl was also investigated as shown in FIG. 4. The pH was adjusted by $CO_2$ buffer solutions in water phase and controlled by a pH meter and the methodology for determining diacetyl concentration was identical to the methodology set forth above.

b. Reduction of Diacetyl During the Secondary Fermentation

Immobilized yeast columns of 1.6 l (one packed with DEAE cellulose and the other packed with calcium alginate beads) prepared as set forth in Section 2 of the specification were tested for their diacetyl reduction capacities and rates by feeding beer containing free diacetyl at different flow rates and a temperature of about 10° C. The beer utilized was traditionally fermented and lagered and contained low concentrations of diacetyl and its precursors and free diacetyl was added to reach a concentration of 0.20 mg/l (as measured using methodology set forth in Section 1). When the diacetyl concentration was 0.20 mg/l less than two hours were required to reduce the level below the taste threshold value of 0.05 mg/l. The diacetyl reduction was slightly faster in the DEAE-column, most probably due to the better contact between the yeast and the beer.

The synthesis of new alpha acetolactate during the secondary fermentation was negligible. This was most probably due to the low-growth conditions of the yeast in the immobilized bed and the relatively high flow rate in the column.

The results of this comparison are set forth in FIG. 5.

Figure 6:
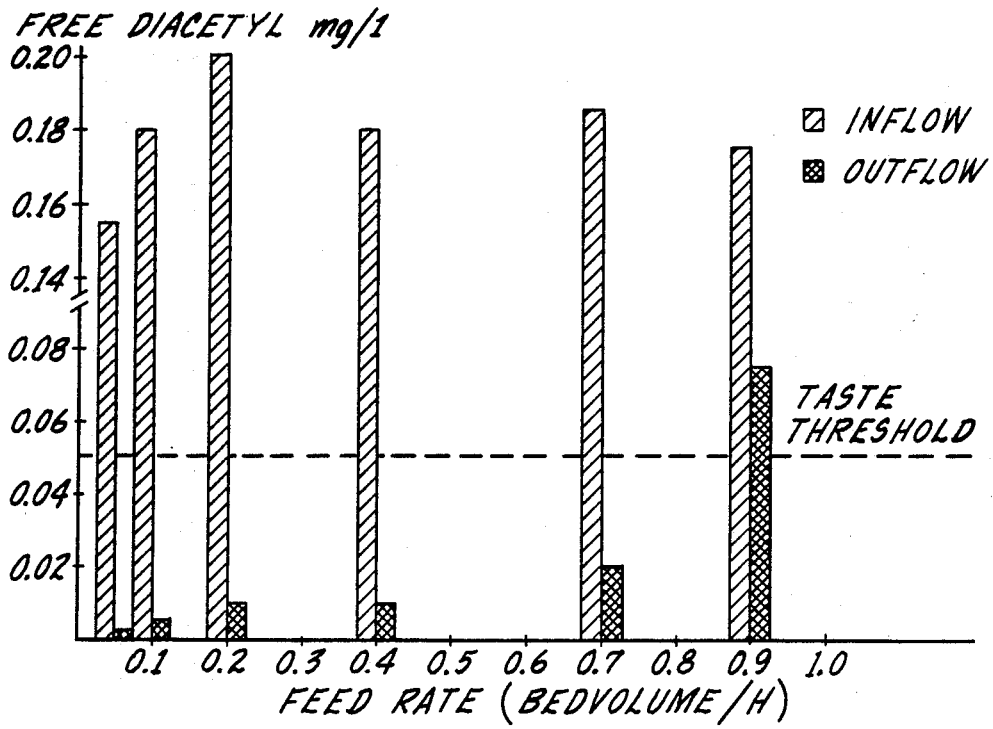
FIG. 6 shows the results of diacetyl removal at various feed rates using a DEAE cellulose packed column wherein the concentration of diacetyl was measured before and after feeding fermented beer through the column containing immobilized yeast cells.

FIG. 6 shows the results of diacetyl removal at various feed rates using a DEAE cellulose-packed column; the concentration of diacetyl was measured (as described above) before and after feeding fermented beer through the column containing immobilized yeast cells.

2. PILOT SCALE EXPERIMENTS

Following laboratory scale experiments, "Pilot Scale" experimentation was pursued. "Green" or immature beer produced by primary fermentation was centrifuged through a Westfalia centrifuge and the beer was led to a feeding buffer tank of 24 m$^3$. (The beer was fermented by the method set forth in Section 3 of the specification.) From the buffer tank the beer was pumped by an adjustable feeding pump through the heat treatment unit consisting of a heating section, a holding tube and a cooling section. The holding tube volume was 10 l and the temperature used was 60° C. The holding time was varied according to the feeding rate.

Two Pharmacia chromatograph columns of 60 l each were used as the reactors and prepared as follows: after rinsing and neutralizing the carrier material, the columns were filled with wort and pitched with yeast suspension at a range of about $10^{10}$ cells/l carrier material. Aerated wort was then fed for 24 hours at a rate of 0.1 bed volumes/h.

The carrier bed volume was 100 l. Both upstream and downstream flows were tested. The column temperature was the ambient temperature of 10-15° C. in the fermentation cellar. The flow rates tested varied between about 10 and about 100 l/h. A counterpressure of 1.6 bar was applied in the columns to keep the carbon dioxide dissolved and thus prevent channeling in the columns. The beer from the columns was collected in a receiving tank and sampling points were taken before and after the heat treatment as well as before, between and after the columns.

The laboratory scale results indicated that the time required to reduce the diacetyl level from its original 0.20 mg/l to below the taste threshold level of 0.05 mg/l was less than two hours, corresponding to a flow rate of approximately 1 bed volumes/h. It was also shown that when attenuated beer with added diacetyl was used, the synthesis of new alpha acetolactate was negligible during the secondary fermentation due to the lack of nutrients and to the low-growth conditions of the immobilized yeast.

In pilot scale the results were very similar to those obtained in the laboratory, with mean diacetyl reduction times of less than 90 minutes in order to lower diacetyl concentration to about from 0.10 mg/l to about 0.02 mg/l which is well below the taste threshold for humans. In some situations, diacetyl levels of up to 0.1 mg/l could be reduced with contact times of only 30 minutes, corresponding to 2 bed volumes/h. Counter pressure was used in the column to keep the $CO_2$ dissolved in the beer.

Figure 7:
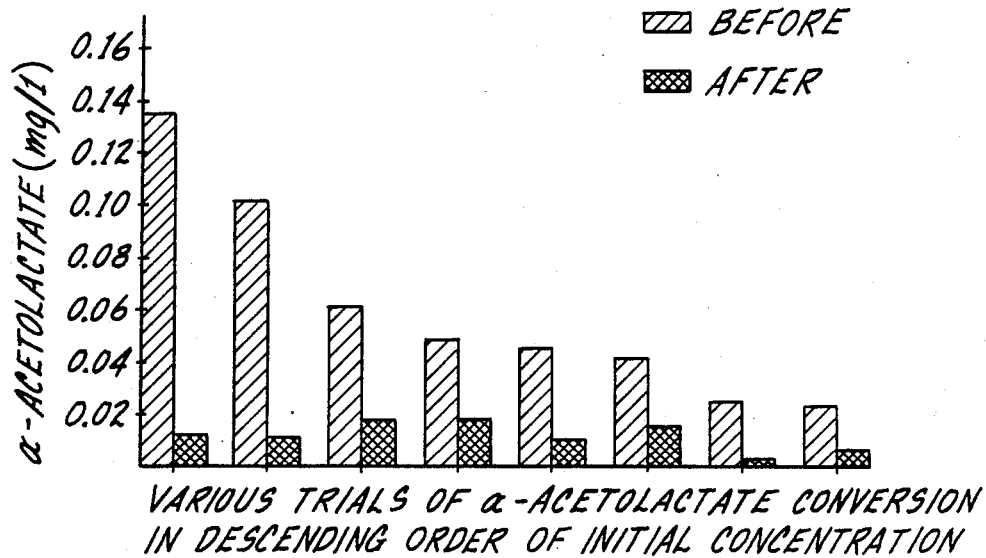
FIG. 7 shows the concentration of diacetyl in beer before and after heat treatment at 60° C.

FIG. 7 sets forth data showing the concentration of alpha acetolactate in fermented beer before and after heat treatment (as described above) at 60° C.

Figure 8:
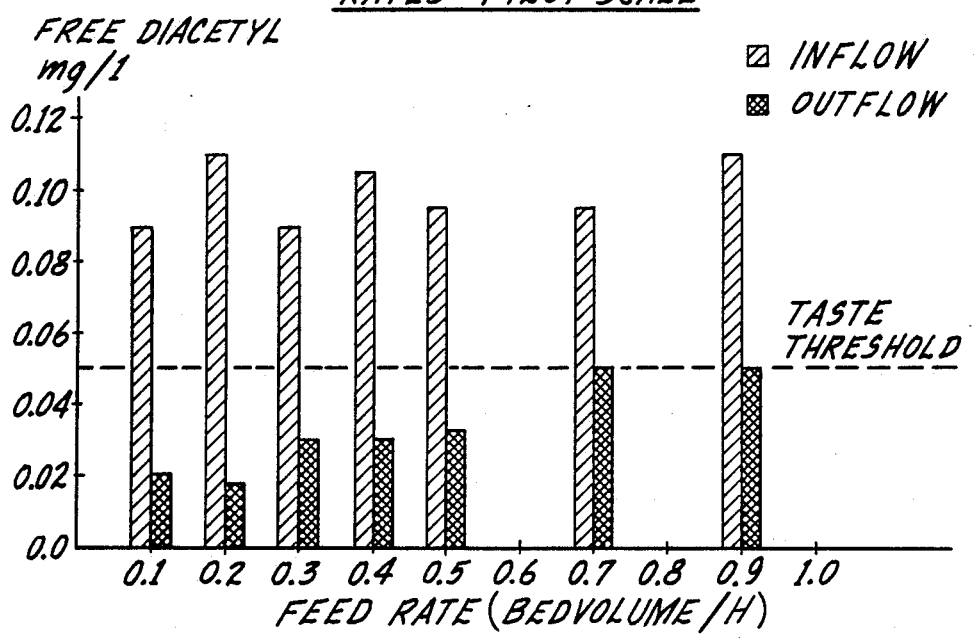
FIG. 8 shows the concentration of free diacetyl before and after the beer was fed through a column. The results are shown using various feed rates and the concentration of free diacetyl is compared to the taste threshold.
Figure 9:
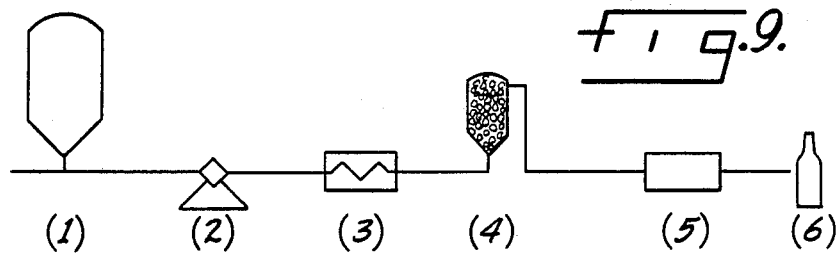
FIG. 9 is a flow diagram which shows a process for brewing beer, including the novel methods which comprise the instant invention. Conventional batch fermentation (1) is utilized wherein the wort is fermented by yeast using conventional methods and containers. After fermentation is complete, the yeast is removed by a suitable method, such as fermentation (2) and the resulting beer is heat treated under pressure (3) to promote the reaction of acetolactale and other diacetyl precursors to diacetyl. Pasteurization also takes place at this stage. The heat treated beer is continuously fed through a reaction column (4) packed with immobilized yeast under pressure at a flow rate sufficient to lower the concentration of diacetyl to acceptable taste levels. Following this step, conventional methods of beer treatment, filtration and bottling (5) precede the preparation of beer ready for consumption (6).

FIG. 8 sets forth data showing the concentration of diacetyl in fermented beer prior to treatment in the column reaction, and the concentration of diacetyl after treatment in the column reaction; the graph shows the before/after results using different flow rates. The beer matured by the continuous method exhibited diacetyl concentrations below the taste threshold. Through organoleptic analysis of the beer, it was observed that the beer had acceptable, mature flavor consistent with conventional taste. The maturation step took considerably less time than conventional lagering.

Using the wort fermented as set forth in Section 3 of this Specification, green beer matured by the method of the instant invention was compared to beer matured by traditional lagering. The green beer was fed through a 100 l column packed with DEAE cellulose resin and yeast cells immobilized as set forth above. An analysis of the beer matured by both methods is set forth below:

| BEER ANALYSIS: CONVENTIONAL LAGERING VERSUS CONTINUOUS MATURATION | | Maturation Using Cool Column With Immobilized Yeast: Flow Rate 0.3 bv/h | Traditional Maturation |
|---|---|---|---|
| Original Extract | % w/w | 12.6 | 12.4 |
| Alcohol Content | % w/w | 4.3 | 4.2 |
| Extract Content, Apparent | % w/w | 2.4 | 2.3 |
| Extract Content, Real | % w/w | 4.4 | 4.2 |
| Degree of Fermentation, App. | % | 81 | 82 |
| Degree of Fermentation, Real | % | 66 | 67 |
| pH | | 4.3 | 4.3 |
| Color | °EBC | 12 | 10 |
| Bitterness | EBU | 26 | 25 |
| Original VDK, Total | mg/l | 0.10 | |
| Diacetyl, Free | mg/l | 0.03 | |
| Diacetyl, Total | mg/l | 0.04 | 0.02 |
| Ethyl Acetate | mg/l | 23.5 | 23.6 |
| Isoamylacetate | mg/l | 2.0 | 2.7 |
| n-Propanol | mg/l | 11.5 | 11.2 |
| Isobutanol | mg/l | 11.8 | 10.5 |
| o.a. Amylalcohol | mg/l | 15.4 | 14.5 |
| Isoamylalcohol | mg/l | 37.3 | 38.8 |

The DEAE cellulose column used in these tests was regenerated by feeding a hot caustic solution consisting of 2% NaOH at about 60° C. through the columns until the material color was uniformly bright. The column was rinsed with water at pH of about 10 and neutralized with $Na_2S_2O_5$ at a pH of about 7. The column was rinsed with water and filled with wort, pitched with yeast cells (about $10^{10}$ cells/liter of carrier); the cells were grown with aerated wort for 24 hours and were then ready for treatment of green beer.

3. Comparison of a Conventional Maturation Process and the Method of the Instant Invention a. Brewing The wort was produced by a conventional method from 5,500 kg of barley malt and water to give a total volume of 33,400 l wort with 12,5° Plato original gravity. Mashing was done by the infusion method with rests at the temperatures 48° C.—63° C. —72° C.—78° C.

The wort was separated from the mash in a lautertun and boiled in a wort copper at about 100° C. for about 90 minutes. The hops was added to the copper, 2800 g alpha-acids as extracts and pellets, during the boiling. The hot tub was separated from the wort in a whirlpool by sedimentation for about 2 hours.

Finally the wort was cooled in a plate heat exchanger from 100° C. to 10° C., aerated and pitched with yeast and transferred to a suitable container for primary fermentation.

| | |
|---|---|
| original gravity | about 6–18° Plato |
| apparent limit - attenuation | about 1–4° Plato |
| pH | about 4.5–5.5 | b. Primary Fermentation

Primary fermentation was conducted in a conventional way; the cooled wort, pitched with about $20 \times 10^6$ cells/ml brewing yeast, was pumped into a horizontal fermentation tank.

The temperature in the fermentation tank was kept at about 10° C. and the fermentable sugars were consumed in 7 days giving a young ("green") beer with an apparent extract content of 2.2° Plato and alcohol content of 4.3% by weight.

The amount of yeast cells increased to a level of $10^8$ cells/ml by the end of the 7 day period. Most of the yeast settled at the bottom of the tank giving a beer with about $25 \times 10^6$ cells/ml in suspension.

The beer, containing 0.20 ppm diacetyl as free diacetyl and precursors was pumped either to a lager tank for maturation (secondary fermentation) according to the conventional method mg/l. The diacetyl reduction was slightly faster in the DEAE column, or to a separator and immobilized yeast column reactor for maturation according to the method of the instant invention.

The typical primary fermentation conditions can be as follows:

| | |
|---|---|
| pitching with yeast | about 15–25 $10^6$ cells/ml |
| original gravity | about 6–18° Plato |
| temperature | about 5–25° C. |
| retention time | 4–8° days |
| pressure | about 0–2 bar | c. Maturation (Secondary Fermentation)—Conventional Method

The beer, containing 0.20 ppm diacetyl and $25 \times 10^6$ cells/ml yeast, was lagered at a temperature of 10° C. for 3 weeks in a horizontal lager tank and finally cooled to 0° C. for 1 day. The diacetyl content decreased to 0.02 ppm.

The maturity of the beer was acceptable as measured by the diacetyl concentration; the beer had an acceptable taste.

d. Maturation (Secondary Fermentation)—Instant Invention

The green beer, containing 0.20 ppm diacetyl and $25 \times 10^6$ cells/ml yeast, was separated in a centrifuge to bring the yeast concentration down to less than about $10^4$ cells/ml. The separated beer was heat treated in a plate heat exchanger to about 70° C. and pumped through a holding tube with a retention time of 15 minutes followed by cooling in a plate heat exchanger to 15° C.

The cooled heat treated green beer was then pumped through an immobilized yeast column reactor at a flow-rate of 0.5 Bedvolumes/h.

The reactor was filled with a DEAE-cellulose as a carrier material, initially pitched with brewing yeast to obtain a yeast concentration of about $10^7$ cells/g carrier. The total bedvolume of the column reactor was 100 l and the flow of beer was conducted downwards through the column. The temperature of the reactor remained at 15° C. and the overpressure kept at 1.6 bar by means of a pressure valve in the outlet to suppress carbon dioxide dissolution in the column. After the column reactor the beer was led to a buffer tank prior to stabilization and filtering. The diacetyl concentration was measured after treatment in the column and decreased to about 0.02 ppm; i.e., well below the taste threshold.

The process could be run for several weeks, at least four weeks, continuously without interruption and without contamination. In case of clogging due to too high yeast concentration or contamination by bacteria due to inadequate aseptic conditions the column was washed with hot water and a 2% NaOH solution at 60° C., in an upflow manner at a flowrate of 2 Bedvolumes/h until the outlet changed in color from black or dark brown to amber or light. The column was rinsed with brewing water and neutralized with 0.5% sodium bisulphite solution. Finally the column was pitched with brewing yeast suspended in freshly cooled wort to obtain yeast concentration of $10^7$ cells/g carrier, and the column was ready for further use.

| Typical Conditions for Maturing Beer | | |
|---|---|---|
| | Maturation Using the Instant Invention | Conventional Maturation |
| *original gravity | 6 ... 18° Plato | 6 ... 18° Plato |
| *alcohol | 1,5 ... 5,9° w/w | 1,5 ... 5,9° w/w |
| *real extract | 3,0 ... 6,9° Plato | 3,0 ... 6,9° Plato |
| *fermentable real extract | max 1,5° Plato | 0 ... 4,0° Plato |
| *free diacetyl | | |
| in | max 0,50 ppm | max 0,50 ppm |
| out | max 0,05 ppm | max 0,05 ppm |
| *temperature | | |
| holding cell | 50 ... 90° C. | — |
| column reactor | 10 ... 25° C. | — |
| lager tank | — | 0 ... 18° C. |
| buffer tank | 0 ... 25° C. | — |
| *time | | |
| holding cell | 1 ... 30 min | — |
| column reactor | 0,3 ... 3,0 h | — |
| lager tank | — | 1 ... 6 weeks batch process |
| *flow rate | 0,1 ... 2,0 BV/h (Bed Volumes/h) | — |
| *pressure (over) | | |
| holding cell | max 9 bar | — |
| column reactor | max 3 bar | — |
| lager tank | — | max 1 bar |
| buffer tank | 1 bar | — |
| *yeast concentration | | |
| in feed | max $10^4$ cells/ml | $10^6$ ... $10^8$ cells/ml |
| in column | $10^5$ ... $10^{10}$ cells/g carrier | — |
| lager tank | — | $10^5$ ... $10^7$ cells/ml |
| in outlet | $10^4$ ... $10^5$ cells/ml | — |
| *taste of beer produced | mature no off-flavor | mature | e. Beer Handling and Bottling

The beer from both methods was stabilized by cooling to about −1.5° C. into a buffer tank with a retention time of 30 min. After the buffer tank diatomaceous earth was added and the beer was filtered in a candle filter and finally in a polishing sheet filter.

The carbon dioxide content of the beer was controlled at 5 g/l and the beer pumped into pressurized bright beer tanks.

From the bright beer tanks the beer was conducted to the bottling lines through a pasteurization unit, 72° C. for 30s prior to the bottling machine.

A taste comparison between the beer brewed using the conventional maturation method and the maturation method of the instant invention revealed no significant distinction between the two beers. Maturation of the beer by means of the instant invention was faster and more efficient and when used on a commercial scale, will substantially increase the efficiency and decrease the cost of brewing without any significant effect on the taste and quality of the beer.

The foregoing general discussion and experimental examples are intended to be illustrative of the present invention, and are not to be considered as limiting. Other variations within the spirit and scope of this invention are possible, and will present themselves to those skilled in the art.

I claim:

1. A method for the continuous maturation of beer fermented with yeast which comprises:
   removing substantially all of said yeast from the fermented beer after primary fermentation;
   heat treatment of said beer within the range of about 60° C. to less than about 90° C. at a pressure in excess of atmospheric pressure to effect the conversion of all or substantially all of the alpha acetolactate and other diacetyl precursors present to diacetyl;
   cooling said heat treated beer to a temperature of between about 0° C. and about 25° C.; feeding said beer under pressure through a reaction column packet with immobilized yeast cells on a suitable carrier material at a flow rate which effects the conversion of said diacetyl to acetoin in order to lower the concentration of said diacetyl; and
   cooling said fermented, heat treated, matured beer to a temperature sufficient to stabilize said beer.

2. The method of claim 1 wherein said yeast removal reduces the concentration of yeast less than about $10^4$ cells/ml.

3. The method of claim 2 wherein said yeast removal is carried out by centrifugation.

4. The method of claim 1 wherein said heat treatment is carried out at about 90° C.

5. The method of claim 1 wherein said heat treatment is carried out at about 60° C.

6. The method of claim 1 wherein said reaction column has a yeast cell density of between about $10^5$ to about $10^{10}$ yeast cells per gram of carrier.

7. The method of claim 6 wherein said reaction column has a yeast cell density of about $10^7$ yeast cells.

8. The method of claim 1 wherein the carrier present in said reaction column is an anion exchange resin.

9. The method of claim 8 wherein the carrier present in said reaction column is a DEAE cellulose resin.

10. The method of claim 1 wherein the carrier present has regenerative properties.

11. The method of claim 1 wherein said flow rate of said heat treated fermented beer through said reaction column is about 0.1 and about 2.0 bed volumes/hour.

12. The method of claim 1 wherein said flow rate of said heat treated fermented beer through said reaction column is about 0.5 bed volumnes/hour.

* * * * *